US010162623B2

(12) United States Patent
Coolidge

(10) Patent No.: US 10,162,623 B2
(45) Date of Patent: Dec. 25, 2018

(54) REMOTE MANAGEMENT OF ELECTRONIC PRODUCTS

(71) Applicant: Schlage Lock Company LLC, Carmel, IN (US)

(72) Inventor: Frank L. Coolidge, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

(21) Appl. No.: 15/608,138

(22) Filed: May 30, 2017

(65) Prior Publication Data
US 2017/0269923 A1    Sep. 21, 2017

Related U.S. Application Data

(63) Continuation of application No. 14/811,140, filed on Jul. 28, 2015, now Pat. No. 9,665,362, which is a continuation of application No. 13/889,751, filed on May 8, 2013, now Pat. No. 9,092,299.

(60) Provisional application No. 61/644,386, filed on May 8, 2012.

(51) Int. Cl.
| | |
|---|---|
| G06F 8/65 | (2018.01) |
| G06F 8/654 | (2018.01) |
| G06F 17/30 | (2006.01) |
| G07C 9/00 | (2006.01) |
| E05B 47/00 | (2006.01) |
| G06Q 10/00 | (2012.01) |
| G06Q 30/00 | (2012.01) |

(52) U.S. Cl.
CPC .......... *G06F 8/65* (2013.01); *G06F 17/30356* (2013.01); *G07C 9/00571* (2013.01); *E05B 47/00* (2013.01); *G06F 8/654* (2018.02); *G06Q 10/20* (2013.01); *G06Q 30/012* (2013.01); *G07C 2009/00841* (2013.01)

(58) Field of Classification Search
CPC .......................... G06F 8/60–8/71; E05B 47/00
USPC ........................ 717/168–178; 726/2; 70/277
See application file for complete search history.

(56) References Cited

U.S. PATENT DOCUMENTS

| | | |
|---|---|---|
| 6,643,506 B1 | 11/2003 | Criss et al. |
| 7,167,892 B2 | 1/2007 | Defosse et al. |
| 7,818,734 B2 | 10/2010 | Giannini et al. |
| 8,120,460 B1 | 2/2012 | Zhu |
| 2003/0147369 A1 | 8/2003 | Singh et al. |
| 2004/0003257 A1 | 1/2004 | Mitchell |
| 2006/0026304 A1 | 2/2006 | Price |
| 2006/0168574 A1 | 7/2006 | Giannini et al. |
| 2006/0259207 A1 | 11/2006 | Natsume |
| 2007/0245369 A1 | 10/2007 | Thompson et al. |
| 2008/0005733 A1 | 1/2008 | Ramachandran et al. |
| 2010/0042368 A1 | 2/2010 | Lovelace et al. |

(Continued)

OTHER PUBLICATIONS

European Examination Report; European Patent Office; European Application No. 13788532.3; dated Aug. 23, 2017; 4 pages.

(Continued)

*Primary Examiner* — Geoffrey R St Leger
(74) *Attorney, Agent, or Firm* — Taft Stettinius & Hollister LLP

(57) ABSTRACT

A remote server may receive a data log with information regarding the status and/or a setting of an electronic product. The remote server may store information in the data log in a database. The remote server may process information in the database to determine whether a newer version of firmware is available for the electronic product.

20 Claims, 4 Drawing Sheets

(56) References Cited

U.S. PATENT DOCUMENTS

| | | |
|---|---|---|
| 2010/0191951 A1 | 7/2010 | Malone et al. |
| 2011/0053557 A1 | 3/2011 | Despain et al. |
| 2011/0071724 A1 | 3/2011 | Heine et al. |
| 2011/0252471 A1 | 10/2011 | Lin et al. |
| 2011/0316667 A1 | 12/2011 | Tran |
| 2012/0011367 A1 | 1/2012 | Denison |
| 2012/0123951 A1 | 5/2012 | Hyatt et al. |
| 2012/0280783 A1 | 11/2012 | Gerhardt et al. |
| 2013/0024222 A1 | 1/2013 | Dunn |
| 2013/0176107 A1 | 7/2013 | Dumas et al. |
| 2013/0198731 A1 | 8/2013 | Inai |
| 2014/0245280 A1 | 8/2014 | Chen et al. |
| 2014/0260452 A1 | 9/2014 | Chen |

OTHER PUBLICATIONS

New Zealand Examination Report; New Zealand Patent Office; New Zealand Application No. 702710; dated Jun. 15, 2017; 4 pages.
B.A.S.I.S. Offline User Guide, Stanely Security Solutions, Jul. 2012, 142 pages, [retrieved on Jul. 25, 2014], Retrieved from the Internet: <URL:http://www.bestaccess.com/techpubs/T80946c.pdf>.
Abate, A., et al., Development of a Centralized Electronic Lock System Based on 3G Broadband Modules, Mar. 2012, 62 pages, [retrieved on Jul. 24, 2014], Retrieved from the Internet: <URL:http://publications.lib.chalmers.se/records/fulltext/156509.pdf>.
European Search Report; European Patent Office; European Patent Application No. 13788532.3; dated Feb. 29, 2016; 10 pages.
OnGuard: ILS Lock Operation User Guide, product version 6.4, Lenel, May 2010, 120 pages, [retrieved on Jul. 24, 2014], Retrieved from the Internet: <URL:http://en.onity.com/markets/Documents/ILS%20Lock%20User%20Manual.pdf>.
International Search Report; International Searching Authority, US Patent and Trademark Office; International Patent Application No. PCT/US2013/040114; dated Aug. 2, 2013; 2 pages.
Written Opinion; International Searching Authority, US Patent and Trademark Office; International Patent Application No. PCT/US2013/040114; dated Aug. 2, 2013; 4 pages.
Australian Examination Report; Australian Patent Office; Australian Application No. 2013259563; dated Dec. 7, 2015; 3 pages.
New Zealand Examination Report; New Zealand Patent Office; New Zealand Application No. 702710; dated Jul. 14, 2016; 6 pages.
Canadian Office Action; Canadian Intellectual Property Office; Canadian Application No. 2985367; dated Sep. 20, 2018; 6 pages.

| DEVICE PROPERTIES | Main Entrance | Office 1 | Office 2 |
|---|---|---|---|
| MAIN SERIAL NUMBER | 000102102200152 | 000012010320173 | 000012010320172 |
| READER SERIAL NUMBER | 000010710460076 | 000012010320173 | 000012010320172 |
| MODEL TYPE | AD200 | CO200 | CO250 |
| MOTOR CYCLES | 1765 | 2495 | 2849 |
| CYCLES SINCE BATTERY CHANGE | 534 | 1089 | 489 |
| LAST SYNC TIME | 2010-08-27 0:00:00 0 | 2010-08-27 9:27:23 0 | 2010-08-27 9:54:13 0 |
| MAIN BORN DATE | 2010-06-30 | 2010-08-27 | 2010-08-27 |
| READER BORN DATE | 2011-03-07 | 2010-08-27 | 2010-08-27 |
| DAYS SINCE USE | 222 | 397 | 630 |
| MAIN FIRMWARE VERSION | 2.19.3 | 2.7.0 | 2.9.0 |
| MAIN BOOTLOADER VERSION | 1.6 | 1.6 | 1.6 |
| MAIN HARDWARE VERSION | 1.4 | 1.4 | 1.4 |
| READER FIRMWARE VERSION | 2.18.4 | N/A | N/A |
| READER BOOTLOADER VERSION | 1.6 | N/A | N/A |
| READER HARDWARE VERSION | 1.7 | N/A | N/A |
| BATTERY TYPE | 4 Pack | 4 Pack | 4 Pack |
| MAIN BATTERY | 6.2 | 5.72 | 5.77 |
| LITHIUM BATTERY | 2.99 | 3.12 | 3.10 |
| PIN LENGTH | 4 | 4 | 6 |
| IGNORE KEYPAD | 0 | 0 | 0 |
| RECORD LOCK/UNLOCK | 1765 | 2495 | 2849 |

Device Status Log

*FIG. 2*

REMOTE MANAGEMENT OF ELECTRONIC PRODUCTS

CROSS-REFERENCE TO RELATED APPLICATIONS

The present application is a continuation of U.S. patent application Ser. No. 14/811,140 filed on Jul. 28, 2015 and issued as U.S. Pat. No. 9,665,362, which is a continuation of U.S. patent application Ser. No. 13/889,751 filed on May 8, 2013 and issued as U.S. Pat. No. 9,092,299, which claims the benefit of U.S. Provisional Patent Application No. 61/644,386 filed on May 8, 2012, each application is hereby incorporated by reference in its entirety.

BACKGROUND

The present application generally relates to electronic products, and more particularly, but not exclusively, relates to a system for managing electronic products.

Electronic products and/or information about the electronic products may be managed in various ways. Some existing management systems have various shortcomings relative to certain applications. Accordingly, there remains a need for further contributions in this area.

SUMMARY

One embodiment of the present application is a system for remote management of an electronic product. Other embodiments include apparatuses and methods for remotely managing an electronic product. Further embodiments of the present application will become apparent from the description and figures that follow.

BRIEF DESCRIPTION OF THE FIGURES

The description herein makes reference to the accompanying figures wherein like reference numerals refer to like parts throughout the several views, and wherein:

FIG. 2 is an illustration of an exemplary data log.

DETAILED DESCRIPTION OF THE ILLUSTRATIVE EMBODIMENTS

Figure 1:
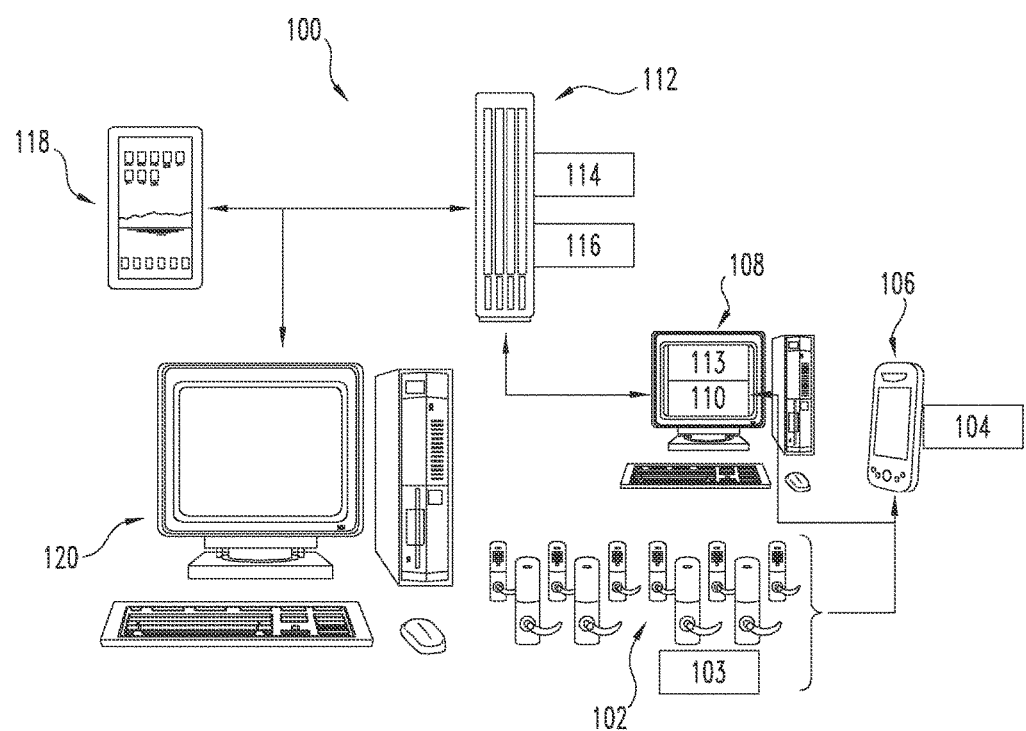
FIG. 1 is a schematic block diagram of an exemplary system.

For the purposes of promoting an understanding of the principles of the present invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 is a schematic block diagram of an exemplary system 100 for remotely managing an electronic product. The system 100 includes electronic products such as one or more offline electronic locks 102, e.g., for a door. It is contemplated that online electronic locks and/or other types of electronic products may be used with the present application. The offline electronic locks 102 may be part of an access control system at a customer site such as a building.

The offline electronic lock 102 is structured to store status information, setting(s), configuration(s), and/or other data 103 about the offline electronic lock 102. A mobile device 106 is structured to acquire the status information, setting(s), configuration(s), and/or other data 103 from the offline electronic lock 102 via a wired or wireless connection. The mobile device 106 may use any application or protocol for communicating with an offline electronic lock 102. One example is the Schlage Utility Software (SUS); however, other applications are contemplated.

The mobile device 106 is structured to generate a product data log 104 based on the status information, setting(s), configuration(s), and/or other data 103 acquired from the offline electronic lock 102. FIG. 2 illustrates an exemplary product data log 104, which may include the status information and the settings of the electronic lock 102. For example, the product data log 104 may include one or more of the following information or settings: serial number(s) (e.g., main serial number, reader serial number), model type, motor cycles, cycles since battery change, last sync time, born date (e.g., main born date or reader born date), days since use, main hardware version, firmware(s) in use (e.g., main firmware version, main bootloader version, reader firmware version, reader bootloader version), battery type (e.g., 4 pack), main battery (e.g., charge in volts), lithium battery (e.g., charge in volts), PIN length, ignore keypad, record lock/unlock, device location, end user contact, power status, system settings, hardware revision(s), date of manufacture, and/or "days since installation." It is contemplated that other information or settings of the offline electronic lock 102 may be stored in the product data log 104. It is contemplated that in some embodiments the offline electronic lock 102 generates the product data log 104 and transmits it to the mobile device 106.

The mobile device 106 may be a personal digital assistant (PDA) (e.g., a Bluebird Pidion), a smartphone, a tablet computer, a laptop computer, and/or any other type of mobile computing device. The connection between the offline electronic lock 102 and the mobile device 106 may be made by any suitable or supported protocol. The mobile device 106 is structured to store the product data log 104 in memory in the mobile device 106. Typically, a user will walk around to the various offline electronic locks 102 so that the mobile device 106 and the offline electronic locks may interact with one another.

A user of the mobile device 106 may view the product data log 104 on the mobile device 106. It is contemplated that the mobile device 106 may store multiple product data logs 104 such as one log for each electronic product the mobile device 106 interacted with or the mobile device 106 may store one master product data log 104 that includes information for multiple electronic products. In some embodiments, repeated communications with the same electronic product will result in only the latest entry being stored for that product.

The mobile device 106 is structured to transmit the product data log 104 to a local computer 108 via wired or wireless connection. The connection between the mobile device 106 and the local computer 108 may be made by any suitable or supported protocol. For example, this may be accomplished automatically using Microsoft sync utilities such as ActiveSync or Windows Mobile Device applications based on the particular operating system used on a user's local computer 108. Some sync utilities use a shared folder on the local computer 108 to exchange data (e.g., product data log 104) between the mobile device 106 and the local computer 108.

The local computer 108 is generally located in the same building or on the same campus as the electronic locks 102. The local computer 108 is structured to store the product data log 104 and/or information from the product data log 104 in a customer data log 110 on the local computer 108. The customer data log 110 may include information about the customer such as contact information, status information and settings for some or all of the electronic products at the customer's site(s), and any other type of customer information. A user of the local computer 108 may view the product data log 104 or the customer data log 110 on the local computer 108.

The local computer 108 is structured to transmit at least a portion of the product data log 104 and/or the customer data log 110 to a remote server 112 automatically or when requested or selected by a user of the local computer 108. The remote server 112 may be maintained by a manufacturer of the electronic products. The local computer 108 and the remote server 112 may communicate with one another over the Internet through a cloud or web interface. For example, the local computer 108 may include an application 113, which upon start-up will log into the remote server 112 using, e.g., an administrator name, location, contact information, password, and/or any other information. During daily use, the application 113 may monitor the shared folder used by the local computer 108 and the mobile device 106 and send any new product data log 104 (as part of or instead of customer data log 110) to the remote server 112.

Furthermore, if a customer site is using multiple mobile devices 106 to manage their facility, the local computer 108 may append the facility and contact information to each product data log 104 before sending the product data log 104 to the remote server 112 to ensure that all of the product data logs 104 are uniquely identified as belonging with that facility.

As another example, the local computer 108 may include a web browser, which communicates with a web page and/or web portal on the remote server 112 via the Internet. However, other communication channels and/or mediums are contemplated. The remote server 112 may be part of cloud service for remotely managing electronic products. Furthermore, although the remote server 112 is shown as one server in FIG. 1, the remote server 112 may be comprised of multiple servers. The remote server 112 is typically located at a site that is remote from the customer's site and the local computer 108. It is contemplated that the remote server 112 is located at the same site as the local computer 108.

The remote server 112 is structured to store information from the customer data log 110 in a database 114 at the remote server 112 such as electronic product information and customer information. The database 114 may store electronic product information for multiple customers.

The remote server 112 is structured to process electronic product information in the database 114 to determine whether a newer version of firmware is available for an electronic product such as the electronic lock 102. For example, the remote server 112 may compare the latest version number of firmware to the firmware version number for each product in the database 114 to determine if a new version of firmware is available. The remote server 112 may set a flag in the database 114 indicating that an electronic product or a particular customer site should receive a firmware update. If a new version of firmware is available, the remote server 112 may automatically transmit or push a firmware package 116, which includes the particular firmware for the offline electronic lock 102, to the local computer 108. For example, whenever the local computer 108 is logged into the remote server 112, any new versions of firmware may be automatically downloaded to the local computer 108 without any user request, selection, or interaction. The new firmware may downloaded and stored in the shared folder on the local computer 108 that is used by the mobile device 106 to exchange data with the local computer 108. The firmware package 116 may also be emailed from the remote server 112 to the local computer 108.

It is contemplated, however, that a new version of firmware may be suggested by the remote server 112, or a new version of firmware may be pulled from the remote server 112 by the local computer 108. Furthermore, whether a firmware package is pushed, suggested, or pulled is a setting that may be configured in the customer preferences in the web interface of the remote server 112 or in the application 113.

Furthermore, a firmware update may be suggested by, e.g., a pop-up message. There may be various levels of messages. For example, there may be a "must update" message when there would be firmware version conflicts if an update is not done or if there is a liability or security issue identified. Another message may be "should update" when there are improvements available and/or new or changed features. Another message may be "no need to update" when the updates are miscellaneous, cosmetic, and/or minor. Another message may be "contact your OEM supplier before updating" when OEMs will want to test and approve an update first. Another potential feature is turning off automatic updating and/or prompts if a customer chooses to do so.

It is contemplated that release note(s) may be included in the firmware package 116 to inform the user of what has changed. The release notes may be viewed on the mobile device 106, on the local computer 108, and/or the remote server 112.

Once a firmware package 116 has been downloaded to the local computer 108, at least a portion of the firmware package 116 is transmitted to the mobile device 106 as described above by using standard utilities and/or a shared folder. In addition, the firmware package 116 may be pushed or automatically transferred to the mobile device 106 without a user requesting the data. It is contemplated that the mobile device 106 and/or the local computer 108 may prompt a user before transmitting the firmware data to the mobile device 106. Once the mobile device 106 has the new firmware data, the user of the mobile device 106 may update the firmware in the offline electronic lock 102 with data from the firmware package 116.

In addition, the mobile device 106 may be configured to provide one or more of the following features: accept new firmware packages 116 from the local computer 108 when "synced"; place the new firmware into the "root" directory of the mobile device 106 so that the firmware is readily available if/when a firmware update is needed on an offline electronic lock 102; and upon connection with an offline electronic lock 102, inform the user of the mobile device 106 that a firmware update is available, when the customer's offline electronic lock 102 is not running the latest firmware.

As seen in FIG. 1, the system 100 may include other computing devices such as another mobile device 118 and another computer 120. The other computing devices 118, 120 may connect to the remote server 112 via the Internet through a web interface. For example, the mobile device 118 and computer 120 may include web browsers that communicate with a web page or web portal on the remote server 112 to monitor electronic products, adjust settings, adjust preferences, change contact information, and/or view the data stored in the database 114. It is contemplated that the mobile device 118 may include an app that provides communication between the mobile device 118 and the remote server 112 rather than a web browser. The mobile device 118 and the computer 120 may be operated by a customer or by the manufacturer that maintains the remote server 112. Generally, a customer may only view or change the data associated with their site(s) and/or product(s). A customer generally cannot view or change another customer's data.

The remote server 112 may be structured to analyze the information in the database 114 to determine whether any preventative maintenance should be performed on the offline electronic lock 102. For example, based on particular field in the database 114 such as "cycles since battery change" may indicate that the battery in the offline electronic lock 102 should be replaced. If the remote server 112 determines that preventative maintenance should be performed, the remote server 112 may transmit a notification to the local computer 108. Typically, the notification identifies the type of preventative maintenance to be performed. The notification may be an email, a short message service (SMS) message, and/or a message viewable on a web page, web portal, and/or web interface hosted by the remote server 112. Other types of notifications are contemplated.

Users with access to the information in database 114 may provide better technical support of the offline electronic locks 102. For example, a technical support specialist would have access to technical information about how the particular electronic lock 102 has been operating, settings, status, firmware(s) version, hardware versions, system components, among other data to use in troubleshooting issues.

The remote server 112 may be structured to analyze information in the database 114 to determine whether any warranty exists on a particular product and/or whether any warranty replacement parts should be distributed to a customer. If a warranty exists and warranty replacement parts should be provided to a customer, the remote server 112 may transmit a notification to the customer based on customer contact information in the database 114. The notification may be an email, a short message service (SMS) message, and/or a message viewable on a web page, web portal, and/or web interface hosted by the remote server 112. Other types of notifications are contemplated. The present application generally allows the manufacturer, distributor, dealer, and/or end-user to know if product is in its warranty earlier rather than when a product is returned for analysis, which may be when the product is out of its warranty period.

In some embodiments, the mobile device 106 may transmit the product data log 104 directly to the remote server 112 via email or an application that uses the Internet. For example, the mobile device 106 may connect to the Internet using a wireless technology such as WiFi, Bluetooth, a cell phone data network, and/or any other technology for a mobile device to connect to the Internet. Furthermore, in some embodiments, the mobile device 106 may download the latest firmware packages directly from the remote server 112 via the Internet as discussed above.

By having access to the information about how the electronic products are used, the manufacturer may facilitate and improve sales as well as dealer and customer relationships. In addition, if the manufacturer typically sells to distributor and/or dealer, the system 100 may provide the manufacturer the opportunity to communicate with end users proactively (e.g., preventative maintenance) and reactively (e.g., technical support when there is an issue). The information in the database 114 may reduce liability in critical life safety situations.

The information in the database 114 may be used by the electronic product manufacturer for future design improvements and predictive analysis. The manufacturer may also learn from the information in the database 114 which settings are actually being used and knowing those settings that are never used, which may affect future product designs and/or features. For example, if a setting or feature is used frequently, then it is likely that that setting or feature will be present in future products. Similarly, if a setting or feature is used infrequently, then it is less likely that that setting or feature will appear in future products.

The present application may reduce technical service calls because end-users are using electronic products that are programmed with untested firmware version combinations. For example, wholesalers and dealers who buy product now and re-class devices or resell at a later date with newer devices. The present application may reduce the inability or difficulty in locating installed products for recalls or critical bug fixes. The present application may provide data readily available to technical support services personnel for troubleshooting and isolation of a problem in the field. The present application may allow the manufacturer of the electronic product identify who their real end-users are. The present application may allow the manufacturer to determine how the electronic products are used, e.g., how do healthcare, commercial, and education environments differ, if at all? The present application may prevent or reduce customer dissatisfaction when a product is returned as warranty, but later found to be "out of warranty" because the product may returned or fixed earlier while the warranty is still running. The present application may prevent or reduce multiple product firmware versions at a single site resulting in inconsistent product performance. The present application may be prevent or reduce disparate behaviors due to "Phased-IN" purchase and installation timing such as user interface and functionality differences when a product bought last year is mixed with new products purchased this year. The remote server 112 may provide up to the minute technical bulletins and technical notifications direct to its customers.

Figure 3:
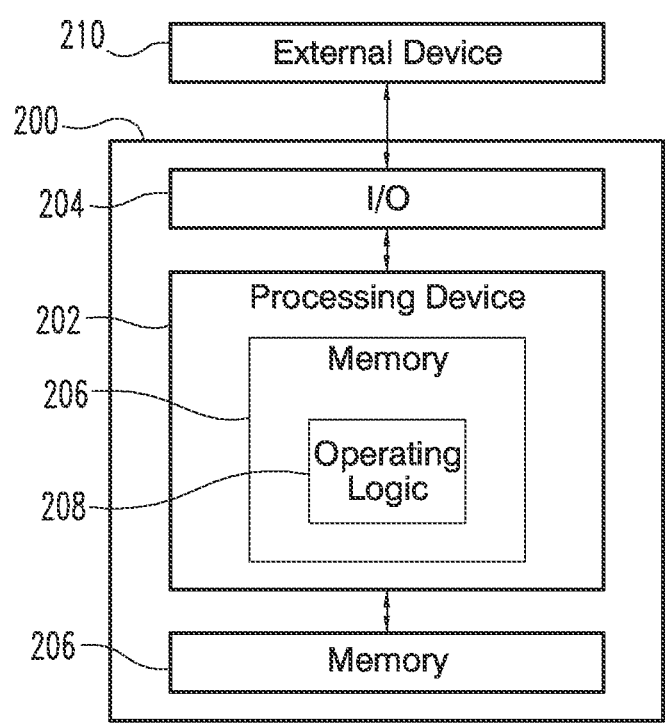
FIG. 3 is a schematic block diagram of an exemplary computing device.

FIG. 3 is a schematic diagram of a computing device 200. The computing device 200 is one example of a electronic product, mobile device, computer, and/or server, which may be utilized in connection with the offline electronic lock 102, mobile device 106, local computer 108, remote server 112, mobile device 118, and/or computer 120 shown in FIG. 1. Computing device 200 includes a processing device 202, an input/output device 204, memory 206, and operating logic 208. Furthermore, computing device 200 communicates with one or more external devices 210.

The input/output device 204 may be any type of device that allows the computing device 200 to communicate with the external device 210. For example, the input/output device 204 may be a transceiver (e.g., WIFI, NFC, Bluetooth), network adapter, network card, interface, or a port (e.g., a USB port, serial port, parallel port, an analog port, a digital port, VGA, DVI, HDMI, FireWire, CAT 5, or any other type of port or interface). The input/output device 204 may be comprised of hardware, software, firmware, and/or state machines. It is contemplated that the input/output device 204 may include more than one transceiver, network adapter, network card, or port.

The external device 210 may be any type of device that allows data to be inputted to or outputted from the computing device 200. For example, the external device 210 may be an electronic product (e.g., an offline electronic lock), a transceiver, a mobile device, an accessory, a reader device, equipment, a handheld computer, a diagnostic tool, a controller, a computer, a server, a processing system, a sensor, a printer, a display, an alarm, an illuminated indicator such as a status indicator, a keyboard, a mouse, or a touch screen display. Furthermore, it is contemplated that the external device 210 may be integrated into the computing device 200. For example, the computing device 200 may be a mobile phone, a handheld diagnostic tool, a smartphone, a laptop computer, or a tablet computer in which case the display would be an external device 210, but the display is integrated with the computing device 200 as one unit, which is consistent with the general design of mobile phones, handheld diagnostic tools, smartphones, laptop computers, tablet computers, and the like. It is further contemplated that there may be more than one external device in communication with the computing device 200. The computing device 200 is one example of an external device 210.

Processing device 202 can be a programmable type, a dedicated, hardwired state machine; or a combination of these; and it can further include multiple processors, Arithmetic-Logic Units (ALUs), Central Processing Units (CPUs), Digital Signal Processors (DSPs), or the like. Processing devices 202 with multiple processing units may utilize distributed, pipelined, and/or parallel processing. Processing device 202 may be dedicated to performance of just the operations described herein or may be utilized in one or more additional applications. In the depicted form, processing device 202 is of a programmable variety that executes algorithms and processes data in accordance with operating logic 208 as defined by programming instructions (such as software or firmware) stored in memory 206. Alternatively or additionally, operating logic 208 for processing device 202 is at least partially defined by hardwired logic or other hardware. Processing device 202 can be comprised of one or more components of any type suitable to process the signals received from input/output device 204 or elsewhere, and provide desired output signals. Such components may include digital circuitry, analog circuitry, or a combination of both.

Memory 206 may be of one or more types, such as a solid-state variety, electromagnetic variety, optical variety, or a combination of these forms. Furthermore, memory 206 can be volatile, nonvolatile, or a mixture of these types, and some or all of memory 206 can be of a portable variety, such as a disk, tape, memory stick, cartridge, or the like. In addition, memory 206 can store data that is manipulated by the operating logic 208 of processing device 202, such as data representative of signals received from and/or sent to input/output device 204 in addition to or in lieu of storing programming instructions defining operating logic 208, just to name one example. As shown in FIG. 3, memory 206 may be included with processing device 202 and/or coupled to the processing device 202. Memory 206 is one example of a computer readable medium.

Figure 4:
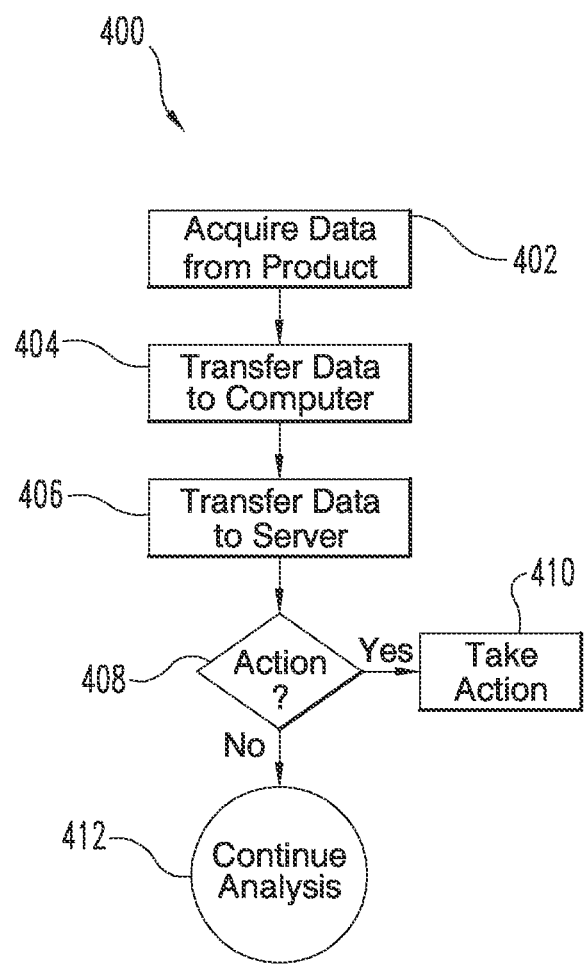
FIG. 4 is a schematic flow diagram of process for managing information in an electronic product.

FIG. 4 is a schematic flow diagram of a process 400 for managing an electronic product. Operations illustrated for all of the processes in the present application are understood to be examples only, and operations may be combined or divided, and added or removed, as well as re-ordered in whole or in part, unless explicitly stated to the contrary.

The process 400 may be implemented in operating logic 208 as operations by software, hardware, artificial intelligence, fuzzy logic, or any combination thereof, or at least partially performed by a user or operator. In certain embodiments, modules represent software elements as a computer program encoded on a computer readable medium, wherein a computing device 200 performs the described operations when executing the computer program.

Process 400 begins at operation 402 in which data is acquired from a product. For example, the mobile device 106 may receive status information, setting(s), configuration(s), and/or other data 103 from the offline electronic lock 102 and generate a product data log 104.

Process 400 then proceeds from operation 402 to operation 404. At operation 404 the mobile device 106 transfers the product data log 104 to the local computer 108 as discussed above.

Process 400 then proceeds from operation 404 to operation 406. At operation 406 the local computer 108 transfers at least a portion of the product data log 104 and/or a customer data log 110 to the remote server 112 as discussed above.

Process 400 then proceeds from operation 406 to operation 408. At operation 408 the remote server 112 analyzes the information stored in the database 114 to determine whether any product needs a firmware update, whether any product needs any preventative maintenance, or whether any other action should be take based on an analysis of the information in the database 114. If the remote server 112 determines that an action should be taken then process 400 proceeds from operation 408 to operation 410 in which the action (e.g., firmware update, preventative maintenance) is taken. After the action is taken, the remote server 112 may continues its analysis of the information and await new product data. If the remote server 112 determines that no action should be taken, the process 400 proceeds from operation 408 to operation 412 in which the remote server 112 may continues its analysis of the information and await new product data.

The present application may be implemented on any type of computing device and using a variety of different software. For example, the present application may be implemented using any database system, any software, or any combination thereof. When a computing device 200 is configured as a database 114, it is contemplated that the database may be any type of database, such as relational, hierarchical, object-oriented, and/or the like.

The present application may include one or more of the following features: capture installed product details and settings; capture end-user and customer contact information; provide product design/application analysis opportunities; allow products to automatically update their operational firmware; and require little or no customer actions to take advantage of the present application.

One aspect of the present application may include a method, comprising: storing lock status information and settings in an electronic lock; transmitting the lock status information and settings from the electronic lock to a mobile device; storing the lock status information and settings in a lock data log in the mobile device; transmitting the lock data log from the mobile device to a local computer; storing the lock data log on the local computer; transmitting a customer data log from the local computer to a remote server, wherein the customer data log comprises information from the lock data log; storing information from the customer data log in an electronic product database in the remote server; processing, with the remote server, information in the electronic product database to determine whether a newer version of firmware is available for the electronic lock; automatically transmitting a firmware package from the remote server to the local computer; transferring the at least a portion of the firmware package from the local computer to the mobile device; and updating the firmware in the electronic lock with the at least a portion of the firmware package via the mobile device.

Features of the aspect of the present application may include: wherein the information is transmitted from the electronic lock to the mobile device via one of a wireless connection and a wired connection; pushing the at least a portion of the firmware package from the local computer to the mobile device when a new version of firmware is available; processing, with the remote server, information in the electronic product database to determine whether any preventative maintenance should be performed on the electronic lock; transmitting a notification to the local computer indicating that preventative maintenance should be performed on the electronic lock, wherein the notification identifies a type of preventative maintenance to be performed; wherein the at least a portion of the firmware package is automatically transferred from the local computer to the mobile device without a user requesting the at least a portion of the firmware package; wherein the lock data log includes at least one of a serial number, model type, motor cycles, cycles since battery change, last sync time, born date, days since use, firmware version, battery type, battery status, PIN length, ignore keypad, record lock/unlock, device location, end user contact, power status, hardware revision, date of manufacture, and days since installation; providing technical support for the electronic lock using information in the electronic product database; processing, with the remote server, the electronic product database to determine whether any warranty replacement parts should be distributed to a customer; and notifying the customer of the warranty replacement parts based on customer contact information in the electronic product database.

Another aspect of the present application includes a system, comprising: an electronic lock configured to store lock status information and settings; a mobile device configured to receive the lock status information and settings from the electronic lock and to store the lock status information and settings in a lock data log; a local computer configured to receive the lock data log from the mobile device and to store the lock data log; a remote server configured receive a customer data log from the local computer, wherein the customer data log comprises information from the lock data log, wherein the remote server is configured to store information from the customer data log in an electronic product database in the remote server, wherein the remote server is further configured to process information in the electronic product database to determine whether a newer version of firmware is available for the electronic lock, wherein the remote server is further configured to automatically transmit a firmware update from the remote server to the local computer, wherein the local computer is configured to automatically transfer the at least a portion of the firmware update to the mobile device; and wherein the mobile device is configured to update the firmware in the electronic lock with the at least a portion of the firmware update.

Features of the aspect of the present application may include: wherein the information is transmitted from the electronic lock to the mobile device via one of a wireless connection and a wired connection; wherein the remote server is configured to process information in the electronic product database to determine whether any preventative maintenance should be performed on the electronic lock; wherein the remote server is configured to transmit a notification to the local computer indicating that preventative maintenance should be performed on the electronic lock, wherein the notification identifies a type of preventative maintenance to be performed; wherein the lock data log includes at least one of a serial number, model type, motor cycles, cycles since battery change, last sync time, born date, days since use, firmware version, battery type, battery status, PIN length, ignore keypad, record lock/unlock, device location, end user contact, power status, hardware revision, date of manufacture, and days since installation; wherein the remote server is configured to process the electronic product database to determine whether any warranty replacement parts should be distributed to a customer, and wherein the remote server is configured to notify the customer of the warranty replacement parts based on customer contact information in the electronic product database.

Yet another aspect of the present application includes an apparatus, comprising: a remote server configured receive a customer data log from the local computer, wherein the customer data log comprises information from a lock data log, wherein the lock data log includes status information and settings of an offline electronic lock, wherein the remote server is configured to store information from the customer data log in an electronic product database in the remote server, wherein the remote server is further configured to process information in the electronic product database to determine whether a newer version of firmware is available for the offline electronic lock, wherein the remote server is further configured to automatically transmit a firmware update for the offline electronic lock from the remote server to the local computer.

Features of the aspect of the present application may include: wherein the remote server is configured to process information in the electronic product database to determine whether any preventative maintenance should be performed on the offline electronic lock, and wherein the remote server is configured to transmit a notification to the local computer indicating that preventative maintenance should be performed on the offline electronic lock, wherein the notification identifies a type of preventative maintenance to be performed.

Another aspect of the present application includes a method, comprising: receiving, with a remote server, a customer data log from the local computer, wherein the customer data log comprises information from a lock data log, wherein the lock data log includes status information and settings of an offline electronic lock; storing, with the remote server, information from the customer data log in an electronic product database; processing, with the remote server, information in the electronic product database to determine whether a newer version of firmware is available for the offline electronic lock; and pushing, with the remote server, a firmware update for the offline electronic lock from the remote server to the local computer.

Features of the aspect of the present application may include: processing, with the remote server, information in the electronic product database to determine whether any preventative maintenance should be performed on the offline electronic lock; and transmitting, with the remote server, a notification to the local computer indicating that preventative maintenance should be performed on the offline electronic lock, wherein the notification identifies a type of preventative maintenance to be performed; processing, with the remote server, information in the electronic product database to determine whether any warranty replacement parts should be distributed to a customer; and notifying, with the remote server, the customer of the warranty replacement parts based on customer contact information in the electronic product database.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    transmitting lock status information of an electronic lock from a mobile device to a local computer;
    transmitting the lock status information from the local computer to a remote server for storage in an electronic product database of the remote server;
    processing, with the remote server, the lock status information retrieved from the electronic product database to determine (i) whether a newer version of a main firmware of the electronic lock is available for the electronic lock and (ii) whether a newer version of a reader firmware is available for a reader associated with the electronic lock;
    automatically transmitting a firmware package from the remote server to the local computer based on the processing of the lock status information in the electronic product database;
    transferring at least a portion of the firmware package from the local computer to the mobile device; and
    updating the firmware in the electronic lock with the at least a portion of the firmware package via the mobile device.

2. The method of claim 1, further comprising:
    pushing the at least a portion of the firmware package from the local computer to the mobile device when a new version of firmware is available.

3. The method of claim 1, further comprising:
    processing, with the remote server, information in the electronic product database to determine whether any preventative maintenance should be performed on the electronic lock.

4. The method of claim 3, further comprising:
    transmitting a notification to the local computer indicating that preventative maintenance should be performed on the electronic lock, wherein the notification identifies a type of preventative maintenance to be performed.

5. The method of claim 1, wherein the at least a portion of the firmware package is automatically transferred from the local computer to the mobile device without a user requesting the at least a portion of the firmware package.

6. The method of claim 1, further comprising:
    processing, with the remote server, the electronic product database to determine whether any warranty replacement parts should be distributed to a customer; and
    notifying the customer of the warranty replacement parts based on customer contact information in the electronic product database.

7. The method of claim 1, wherein the firmware package includes a firmware update of at least one of the main firmware or the reader firmware.

8. The method of claim 1, wherein the lock status information includes a current version of the main firmware and a current version of the reader firmware.

9. The method of claim 1, wherein transmitting the lock status information from the local computer to the remote server comprises:
    monitoring, by a synchronization application of the local computer, a shared folder of the local computer used by the local computer and the mobile device for changes to the lock status information stored in the shared folder; and
    automatically transmitting the lock status information from the local computer to the remote server in response to determining that the lock status information stored in the shared folder has been updated.

10. The method of claim 9, wherein transmitting the lock status information from the mobile device to the local computer comprises transmitting the lock status information using the shared folder.

11. A system, comprising:
    a local computer configured to receive lock status information of an electronic lock from a mobile device and to store the lock status information;
    a remote server configured to (i) receive the lock status information from the local computer and store the lock status information in an electronic product database in the remote server, (ii) process the lock status information retrieved from the electronic product database to determine whether a newer version of firmware is available for the electronic lock, and (iii) automatically transmit a firmware update from the remote server to the local computer based on the processing of the lock status information in the electronic product database, and
    wherein the local computer is further configured to automatically transfer at least a portion of the firmware update to the mobile device to update the firmware in the electronic lock with at least a portion of the firmware update.

12. The system of claim 11, wherein the remote server is configured to process information in the electronic product database to determine whether any preventative maintenance should be performed on the electronic lock.

13. The system of claim 12, wherein the remote server is configured to transmit a notification to the local computer indicating that preventative maintenance should be performed on the electronic lock, wherein the notification identifies a type of preventative maintenance to be performed.

14. The system of claim 11, wherein the remote server is configured to process the electronic product database to determine whether any warranty replacement parts should be distributed to a customer, and wherein the remote server is configured to notify the customer of the warranty replacement parts based on customer contact information in the electronic product database.

15. The system of claim 10, wherein to process the lock status information comprises to determine whether a newer version of a main firmware of the electronic lock is available for the electronic lock and (ii) whether a newer version of a reader firmware is available for a reader associated with the electronic lock.

16. The system of claim 15, further comprising a mobile device configured to update at least one of the main firmware or the reader firmware in response to receiving the firmware update from the mobile device.

17. The system of claim 10, wherein the remote server is further configured to set a flag in the electronic product database indicating that a newer version of the firmware is available for the electronic lock; and wherein the firmware update is automatically transmitted from the remote server to the local computer in response to a determination that the flag has been set.

18. A remote server, comprising:

a processor; and a memory comprising an electronic product database and a plurality of instructions stored thereon that, in response to execution by the processor, causes the remote server to:

receive lock status information of an offline electronic lock from a local computer;

store the lock status information; in the electronic product database in the remote server;

process the lock status information retrieved from the electronic product database to determine (i) whether a newer version of a main firmware of the offline electronic lock is available for the offline electronic lock and (ii) whether a newer version of a reader firmware is available for a reader associated with the offline electronic lock; and automatically transmit a firmware update for the offline electronic lock from the remote server to the local computer based on the processing of the lock status information in the electronic product database.

19. The remote server of claim 18, wherein the plurality of instructions further causes the remote server to:

process the lock status information in the electronic product database to determine whether any preventative maintenance should be performed on the offline electronic lock, and transmit a notification to the local computer indicating that preventative maintenance should be performed on the offline electronic lock, wherein the notification identifies a type of preventative maintenance to be performed.

20. The remote server of claim 18, wherein the firmware update includes a firmware update for at least one of the main firmware or the reader firmware.

* * * * *